(12) United States Patent
Rajesh

(10) Patent No.: US 6,791,940 B1
(45) Date of Patent: Sep. 14, 2004

(54) METHOD AND APPARATUS FOR DATA TRANSMISSION CONTROL IN A COMPUTER NETWORK ENVIRONMENT

(75) Inventor: Padinjaroot Gopi Rajesh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 09/649,744

(22) Filed: Aug. 28, 2000

(51) Int. Cl.[7] ............................................. H04L 12/26
(52) U.S. Cl. .................. 370/219; 370/220; 370/228; 709/239
(58) Field of Search ................................ 370/225, 227, 370/228, 400, 401, 402, 217, 218, 219, 220; 709/239

(56) References Cited

U.S. PATENT DOCUMENTS

| | | | |
|---|---|---|---|
| 5,935,215 A | * | 8/1999 | Bell et al. ..................... 709/239 |
| 5,941,955 A | | 8/1999 | Wilby et al. |
| 6,311,288 B1 | * | 10/2001 | Heeren et al. .................. 714/4 |
| 6,519,224 B2 | * | 2/2003 | Hrastar et al. ................ 370/227 |
| 6,560,218 B2 | * | 5/2003 | McAllister et al. .......... 370/351 |
| 6,625,117 B1 | * | 9/2003 | Chen et al. .................. 370/227 |

* cited by examiner

Primary Examiner—Min Jung
(74) Attorney, Agent, or Firm—Manny W. Schecter; T. Rao Coca; Anthony V. S. England

(57) ABSTRACT

A data network may comprise routers for transmitting data between locations in the network via alternative routes. A network gateway or server may normally send data packets to a particular default router but, for network communication recovery, the gateway needs to select a new default route if the first goes down. The recovery method of this invention comprises storing information indicative of respective ones of a plurality of said alternative routes; accessing the stored information to identify a first of said routes; directing data to the router means for the data to be transmitted to the said another location via the first route; sensing failure of said transmission and, in the event of such failure, accessing said stored information to identify a second of said alternative routes; and directing data to the router means for the data to be transmitted to the said another location via the second route. Ideally, the method includes storing information indicative of the failure of any of said alternative routes and, before directing data to the router means, accessing said stored information to identify said routes in turn until one is identified that is not indicated as having failed.

8 Claims, 1 Drawing Sheet

METHOD AND APPARATUS FOR DATA TRANSMISSION CONTROL IN A COMPUTER NETWORK ENVIRONMENT

BACKGROUND OF THE INVENTION

1. Field of the Invention

The present invention relates to a method and apparatus for controlling transmission of data to destinations in a computer network, for example a local or wide area network or a network of networks such as the Internet, via router means that provides alternative routes to such destinations.

The apparatus of the invention generally comprises a computer operating as a network server or a network gateway and should be connected to one or more networks, having two or more routers acting as a gateway to connect this computer to other networks.

The computer has, loaded into its memory, an operating system which is associated with the data transmission protocol TCP/IP (Transmission Control Protocol/Internet Protocol). TCP is a transport layer protocol which provides a connection oriented, reliable, byte stream service. Another transport layer protocol is the UDP (User Datagram Protocol) which does not provide a reliable service and is usually incorporated in the TCP/IP protocol suite. IP is a network layer protocol, which together with TCP or UDP ensures the proper transmission of data over a TCP/IP network.

The operating system may be a Unix-like system such as "BSD", e.g. version 4.4 of BSD, which is a well known operating system specifically designed for network applications by Berkeley University and presently commercially available from Berkeley Systems Development.

2. Related Prior Art

U.S. Pat. No. 5,941,955 to Wilby and Quintela discloses a distributed data structure formed by a hierarchical network of routers forming a series of end nodes each linkable one to another via a number of intermediate or "parent" nodes. The possibility of each end node being linked to two alternative parent nodes is illustrated in association with the possibility of the link between one end node and one of its parents (the default parent node to which data is normally sent) becoming broken. If such a break occurs, this is sensed by the end node which then transmits data to the other parent node.

Wilby and Quintela disclose one scheme for arranging how the transfer of data occurs. In fact, one basic tenet of the Internet is that it should be able to recover from failure of one part of it and that when necessary two Internet locations should be able to link up via alternative routes. This aspect of internetworking is handled by the various transmission protocols in association with the routers and the operating system of the gateway or server.

This invention has for one of its objects the provision of an improved method and apparatus for network transmission control at the protocol/operating system level.

SUMMARY OF THE INVENTION

According to the invention, there is provided a data transmission control method, and computer apparatus using such method, for a network comprising router means for enabling the computer to transmit data to another location in the network via alternative routes. In the method and apparatus information indicative of the alternative routes is accessed so as to identify a first of said routes. Then the data is passed to the router means with the router means controlled so that the data to be transmitted to the said another location goes via the first route assuming that this route is not broken. In the event of such route failure, the stored information is accessed to identify a second of said alternative routes and the computer directs the data to the router means for the data to be transmitted to the said another location via the second route.

Advantageously, whilst failure of said transmission via the first route is sensed, said data is retransmitted a pre-set plurality of times before the second route is identified.

The router means may comprise a plurality of routers to which said computer is connected and said route indicative information comprises the network addresses of respective ones of the routers.

Preferably, the method includes storing information indicative of the failure of any of said alternative routes and, before directing data to the router means, accessing said stored information to identify said routes in turn until one is identified that is not indicated as having failed.

The computer may be under the control of a program including an operating system and an associated data transmission protocol, data identifying a pre-set list of default routes, and a plurality of program sub-routines including sub-routines for splitting said data into packets including destination and routing headers, transmitting said data packets and retransmitting them a pre-set number of times if the transmission is not successful, and for causing said routing headers to identify a further one of said default routes if the existing one has failed.

DESCRIPTION OF THE DRAWING

For a better understanding of the invention, and to show how the same may be carried into effect, reference will now be made, by way of example to the accompanying drawing, the single FIGURE of which is a simplified diagrammatic view of a networked computer system and which may represent a physical system or a logical arrangement in which the different items are provided in or by different physical items.

DETAILED DESCRIPTION

Figure 1:
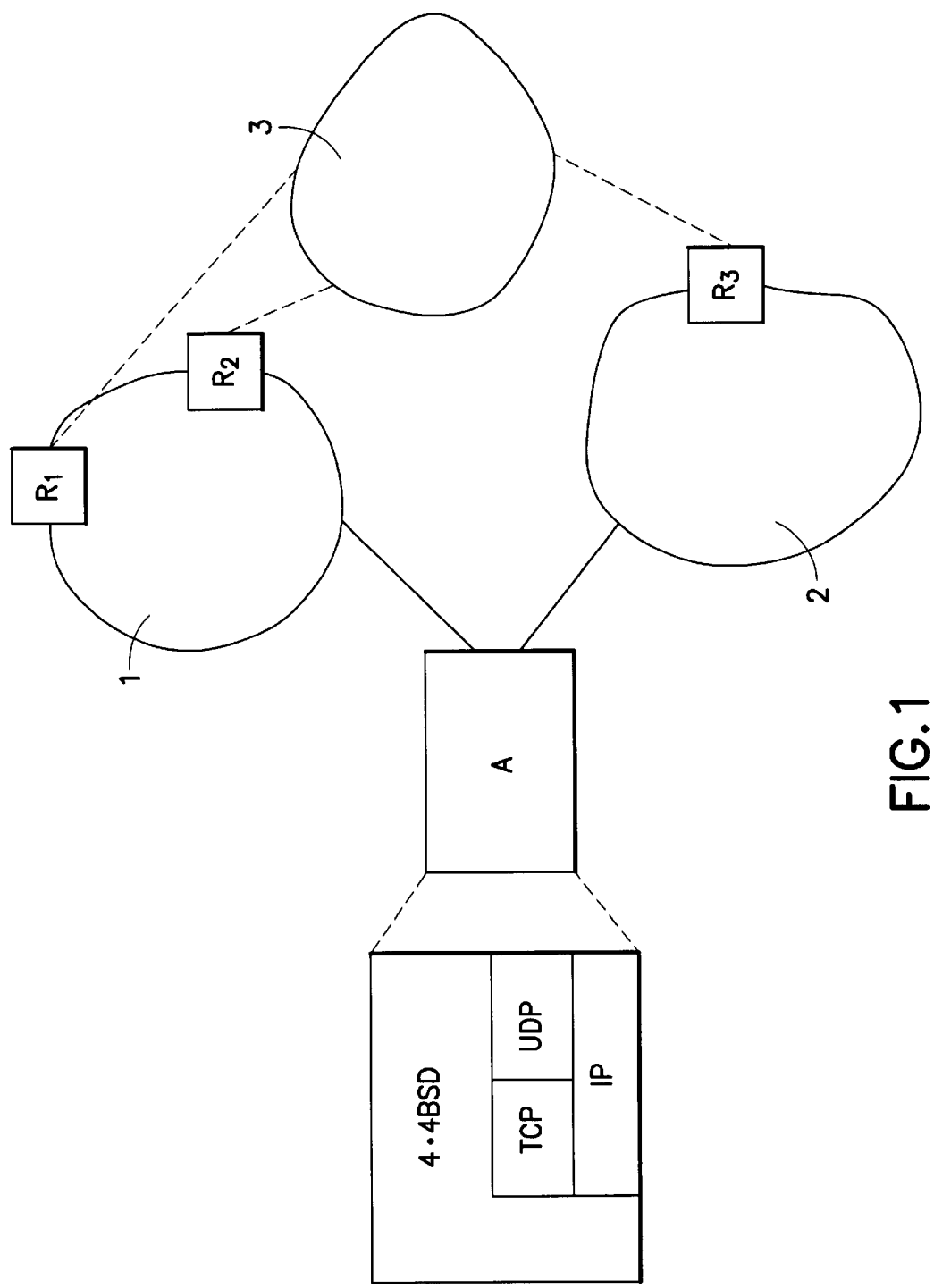

The drawing shows a network with computer A, acting as a network server or a gateway, that is on a LAN (local area network) 1, and may also be associated with other similar LANs (say LAN 2). The computer A will be associated with two or more gateways (R1, R2, R3, etc) which may be in any of the LANs to which computer A is connected to. Each of these routers will in turn associate the computer A to other networks, represented as network 3. The network 3 is only representative of what might be a very complex communication system leading to other people's computers and network.

The computer A has a memory loaded with an operating system such as 4.4 BSD supplied by Berkeley Systems development (some version of it is available elsewhere including version which are available for downloading from the Internet). 4.4 BSD includes or is associated with the TCP/IP protocol suite. This protocol suite together with the operating system comprise of a series of sub-routines that can be called into action when needed. When data is transmitted by computer A, it is delivered into the associated LAN in the form of packets, each comprising a section of the data and a header, which among other information, comprises the destination IP address and the target hardware address, which determines the route along which the packet will travel.

The computer A will be initially configured so as to have a list of addresses of routers (R1, R2, R3, etc) to be in it's list of default route entries. When forming any data packet that the TCP/IP protocol suite will use the default route, this list is accessed and the first default route entry is identified. Then, when TCP data is to be transmitted, it is converted into data packets, each made up with a header that will have the hardware address information of the first default route in the list. Transmission is monitored by the TCP/IP protocol suite, and if it does not receive an acknowledgement for the transmitted packet within a particular period of time, it assumes that the packet did not reach the destination and retransmits the data packet for a chosen number of times. If the transmission remains unsuccessful, the entry identifying the first default router in the list is flagged as not being available. The software controlling the computer comprises a sub-routine which accesses the router list entries in turn and also checks to see if the unavailable flag is not set for that router also, and then makes the address of this router available for making up further packet headers, i.e. the packet are now sent to the new router. When any TCP application that goes through a default router has attempted 4 retransmits, this implementation assumes that the router has gone down and switches the default router for the whole machine to the next default router that the administrator has configured. The proposed implementation is achieved in a sub-routine that is used by both TCP as well as UDP. In effect, if TCP has identified a default route as having gone down, the UDP protocol will also see this route as having gone down and this by default will achieve default route recovery for USP datagrams also by picking up a default route that has not failed.

4.4 BSD comprises a series of functions or sub-routines such as "in_losing( )" and "tcp_output( )" that will be referred to below. The names of sub-routines are recognisable by being enclosed in double quotes and having brackets ( ) at the ends.

In the current 4.4 BSD stack, when TCP attempts to retransmit a packet for more than 4 times, it assumes that the route is bad and calls "in losing( )" that will release the cached route (if any) associated with the Internet Protocol Control Block (inpcb). This is done assuming that the next attempt to retransmit the segment by "tcp_output( )", will hopefully associate a new and better route.

In the present invention, if the current connection goes through a default route and it had attempted 4 retransmits, before the stack calls "in_losing( )" a flag "DF_RTTO" is set with this route entry, signifying that the default route had 'timed-out'. The next call to "rtalloc( )" to associate a new route, will check for this flag and return a pointer to an alternate route entry if it had been configured.

This implementation effectively does the default route recovery and can be implemented in under 15 assembly instructions. Also, this code of checking for the flag is done in the "rtalloc( )" function, which is also used by UDP to find a route associated with it's connection. This makes the default route recovery also applicable to UDP.

In the "tcp_timer( )" function for the case "TCPT_REXT" corresponding to the TCP retransmission timeout, before the call to "in_losing( )", a check is done to see if the route associated has the "RFT_GATEWAY" flag set. If yes, this route is associated with a default router and a flag "DF_RTTO" is also associated with this route.

The next call to "tcp_output( )" makes a call to "rtalloc( )" to find a new route for this TCP connection. If it finds the "DF_RTTO" flag set, it will pick up any other default route that does not have this flag set (if there are any). As a result, the TCP connection will continue to be maintained (assuming the new route is functioning fine).

The following description explains the implementation according to the invention compared to prior art working of BSD TCP/IP. Pseudo-language and comments are used (between "/**/" symbols) to make things more understandable.

There are multiple routers on a LAN segment. In the existing BSD implementation, only one of them can be configured to be the default router. If however this router goes down for any reason, all TCP and UDP connections that use this default router for data transmission will fail to maintain the connection, resulting in the dropping of the established connections.

In the BSD implementation according to the invention, when a TCP data segment does not get acknowledged within a pre-set retransmit interval, the retransmission timer expires and the stack attempts to retransmit packets for a maximum of 12 (TCP_MAXRXTSHIFT) times, before dropping the connection. There is no attempt to recover from the default router failing, in spite of multiple default routers being connected to the same LAN.

The Pseudo-code in a BSD stack will be:

```
==============tcp_timer.c file===============
/* this piece of pseudo-code is from the "tcp_timers" function*/
(step 1)
case TCPT_REXMT:
/* this case is hit when the retransmission timer expires.*/
(step 2)
/* if the stack has attempted 12 retransmits, drop the connection*/
if (retransmit attempts > TCP_MAXRXTSHITT) {
drop the connection;
(step 3)
/* if the stack has attempted retransmission 4 or more times,
it calls the "in_losing" function, which release the cached route
(if there is one) in the hope that the next call to "tcp_output" function
will result in the choice of a better route.*/
    if (retransmit attempts > TCP_MAXRXTSHIFT / 4) {
    call the "in_losing" function;
    }
    (step 4)
    call the "tcp_,output" function that attempts to resend the oldest
unacknowledged packet.
==============tcp_output.c file=================
/* this piece of pseudo-code is from the "tcp_output" function */
(step 5)
calls "tcp_gettaocache" function, to fetch TAO (TCP
Accelerated Open) cache entry for the peer.
/* this piece of pseudo-code from the "tcp_gettaocache" function */
(step 6)
calls "tcp_rtlookup" function to get the route entry to use to connect
to the foreign host.
/* this piece of pseudo-code from the "tcp_rtlookup" function */
(step 7)
if (no route associated)
call the "rtalloc" function, which associates a route with
this connection.
=============route.c file===============
/* this piece of code from the "rtalloc" function */
(step 8)
"rtalloc" function makes a call to the "rtalloc 1" function
which returns a pointer to the route entry that will be used for this
particular connection.
========================================
```

Steps 1 through 8 describe the path taken by the BSD TCP/IP stack.

In the event of the default router (or the link to/from it) going down for some reason, the stack attempts retransmits and by step 3 it frees the cached route associated with it. The next call to "tcp_output" (step 4) will ultimately result in the assigning of the same route entry (step 8) with this connection. Since the default router is still down, by step 2, the connection is dropped.

The implementation according to the invention basically attempts to recover from the failure of this default router by attempting to assign a new default router with this connection. The BSD TCP/IP stack should be modified to permit the administrator to list the IP addresses of multiple default routers by allowing the corresponding list of route data structures to be maintained as a simple linked list of default route entries.

The logic of implementation according to the invention is presented below:

Step (A): In step 3, before the call to "in_losing", a flag DF_RTTO is set with this failed route (if it happens to be a route associated with the default router).

Step (B): In step 8, a check is made to see if the DF_RTTO flag is set before returning the route entry that was looked up by the "rtalloc1" function. If the flag is set, the entries in the list of default routes are read in turn until a route that does not have this flag set is found. That is, a route that has so far not failed is associated with the connection and hence effecting fault recovery of the default router.

The implementation of Step A and Step B uses as little as 15 assembly instructions. Also, the "rtalloc" function used in Step B is common to both the TCP and UDP protocol. Hence the implementation according to the invention makes fault recovery for both TCP as well as UDP.

It will be understood that the foregoing description is given for exemplary illustrative purposes only and does not limit the invention which is defined solely by the following claims. In particular, it will be understood that the drawing is not intended to be limitative of the invention but is applicable to other network arrangements and architectures.

What is claimed is:

1. In a computer which is connected via a router to a computer network at a first location in the network for enabling the computer to transmit data to another location in the network, a method for controlling the transmission of said data comprising:
   a) storing, by the computer, a number of addresses for respective ones of a plurality of;
   b) accessing the stored addresses by the computer to identify one of said routers;
   c) directing data to the identified router for the data to be transmitted to the other location;
   d) sensing, by the computer, failure of said transmission by the identified router;
   e) setting, by the computer, a transmission-failure indication recording a transmission failure by the identified router;
   f) identifying, responsive to the transmission failure, a next one of the routers, including the step of:
      accessing said stored addresses;
   g) checking, by the computer, whether such a transmission-failure indication has been previously set for the identified next one of the routers; and
   h) directing data to the identified next one of the routers for the data to be transmitted to the other location if the checking in step g) determines that no transmission-failure indication has been set.

2. A method according to claim 1, wherein step d) includes the step of determining that said data has been retransmitted a pre-set plurality of times.

3. A method according to claim 1, wherein if the checking in step g) determines that a transmission-failure indication has been set for the identified next one of the routers, the method includes repeating steps f), g) and h).

4. A method according to claim 1, wherein the computer is under the control of a program including an operating system and an associated data transmission protocol, data identifying a pre-set list of default routes, and a plurality of program sub-routines including sub-routines for splitting said data into packets including destination and routing headers, transmitting said data packets and retransmitting them a pre-set number of times if the transmission is not successful.

5. Apparatus according to claim 1, including storage means containing a program including an operating system and an associated data transmission protocol, data identifying a pre-set list of default routes, and a plurality of program sub-routines including sub-routines for splitting said data into packets including destination and routing headers, transmitting said data packets and retransmitting them a pre-set number of times if the transmission is not successful.

6. Computer apparatus which is connected via a router to a computer network at a first location in the network for enabling the computer to transmit data to another location in the network, the apparatus comprising:
   storing means for storing, by a computer, a number of addresses for respective ones of a plurality of routers;
   accessing means for accessing the stored addresses by the computer to identify one of said routers;
   directing means for directing data to the identified router for the data to be transmitted to the other location;
   sensing means for sensing, by the computer, failure of said transmission by the identified router;
   setting means for setting, by the computer, a transmission-failure indication recording a transmission failure by the identified router;
   identifying means for identifying, responsive to the transmission failure, a next one of the routers, wherein the identifying means includes:
      accessing means for accessing said stored addresses;
   and the method includes:
   checking means for checking, by the computer, whether such a transmission-failure indication has been previously set for the identified next one of the routers, wherein the directing means directs data to the identified next one of the routers for the data to be transmitted to the other location if the checking by the checking means determines that no transmission-failure indication has been set.

7. Apparatus according to claim 6, wherein the sensing means includes means for determining that said data has been retransmitted a pre-set plurality of times.

8. An apparatus according to claim 6, wherein if the checking means determines that a transmission-failure indication has been set for the identified next one of the routers, the identifying means, accessing means and directing means repeat their respective identifying, accessing and directing.

* * * * *

UNITED STATES PATENT AND TRADEMARK OFFICE
CERTIFICATE OF CORRECTION

PATENT NO. : 6,791,940 B1
DATED : September 14, 2004
INVENTOR(S) : Padinjaroot Gopi Rajesh It is certified that error appears in the above-identified patent and that said Letters Patent is hereby corrected as shown below:

Column 5,
Line 45, reads "a plurality of;" should read -- a plurality of routers; --.

Signed and Sealed this

Thirtieth Day of November, 2004

JON W. DUDAS
*Director of the United States Patent and Trademark Office*